US010476190B2

(12) United States Patent
Horiuchi et al.

(10) Patent No.: US 10,476,190 B2
(45) Date of Patent: Nov. 12, 2019

(54) TERMINAL FITTING

(71) Applicant: Sumitomo Wiring Systems, Ltd., Yokkaichi, Mie (JP)

(72) Inventors: Kanji Horiuchi, Mie (JP); Kensaku Takata, Mie (JP); Kan Murai, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 16/097,848

(22) PCT Filed: Apr. 27, 2017

(86) PCT No.: PCT/JP2017/016478
§ 371 (c)(1),
(2) Date: Oct. 31, 2018

(87) PCT Pub. No.: WO2017/195595
PCT Pub. Date: Nov. 16, 2017

(65) Prior Publication Data

US 2019/0148863 A1 May 16, 2019

(30) Foreign Application Priority Data

May 12, 2016 (JP) ................................ 2016-095876

(51) Int. Cl.
*H01R 13/03* (2006.01)
*H01R 13/11* (2006.01)
(Continued)

(52) U.S. Cl.
CPC ............. *H01R 13/03* (2013.01); *H01R 13/11* (2013.01); *H01R 13/113* (2013.01); *H01R 13/42* (2013.01); *H01R 43/16* (2013.01)

(58) Field of Classification Search
CPC ........ H01R 13/113; H01R 13/11; H01R 13/03
(Continued)

(56) References Cited

U.S. PATENT DOCUMENTS 6,336,979 B1 * 1/2002 Sugawara ................. C22F 1/02 148/282
8,403,714 B2 * 3/2013 Nakata ................... H01R 13/03 439/877
(Continued)

FOREIGN PATENT DOCUMENTS

JP 2003-297470 10/2003
JP 2012-243542 12/2012
(Continued)

OTHER PUBLICATIONS

International Search Report dated Aug. 1, 2017.

*Primary Examiner* — Gary F Paumen
(74) *Attorney, Agent, or Firm* — Gerald E. Hespos; Michael J. Porco; Matthew T. Hespos

(57) ABSTRACT

A terminal fitting (1) includes a rectangular tubular body (10). A resilient contact piece (16) is arranged inside the body (10) and a pressure receiving piece (18) faces the resilient contact piece (16) inside the body (10). The resilient contact piece (16) has a base end (16Eb) curved inward of the body (10) from an end of the body (10). The pressure receiving piece (18) has one end including a base end (18Eb) curved inwardly of the body (10) from an end of the body (10). An area of a first facing surface (16F) of the resilient contact piece (16) to be contacted by a tab (41) serves as a first plating area (16M) having Ag plating applied thereto. Areas of a second facing surface (18F) of the pressure receiving piece (18) to be contacted by the tab (41) serves as second plating areas (18M) having Ag plating applied thereto.

6 Claims, 8 Drawing Sheets

(51) Int. Cl.
*H01R 13/42* (2006.01)
*H01R 43/16* (2006.01)

(58) Field of Classification Search
USPC .................................................. 439/852, 886
See application file for complete search history.

(56) References Cited

U.S. PATENT DOCUMENTS

| | | | | |
|---|---|---|---|---|
| 8,708,759 | B2 * | 4/2014 | Hirabayashi | H01R 13/113 439/595 |
| 2003/0190847 | A1 | 10/2003 | Nankou et al. | |
| 2003/0219622 | A1 * | 11/2003 | Niebauer | B32B 15/01 428/663 |
| 2010/0018768 | A1 * | 1/2010 | Takahashi | H01R 4/183 174/74 R |
| 2011/0009015 | A1 * | 1/2011 | Yoshida | C23C 28/00 439/886 |
| 2012/0295461 | A1 * | 11/2012 | Hirabayashi | H01R 13/113 439/271 |
| 2012/0295493 | A1 * | 11/2012 | Hirabayashi | H01R 13/113 439/817 |
| 2013/0072075 | A1 * | 3/2013 | Kayamoto | C23C 28/021 439/887 |
| 2015/0004853 | A1 * | 1/2015 | Blumenschein | B32B 15/01 439/887 |
| 2015/0011132 | A1 * | 1/2015 | Shibuya | C25D 5/12 439/887 |
| 2015/0132993 | A1 * | 5/2015 | Osada | B29C 45/14639 439/606 |
| 2015/0280339 | A1 * | 10/2015 | Saka | C25D 7/00 439/886 |
| 2015/0280340 | A1 * | 10/2015 | Anderson | H01R 13/03 439/524 |
| 2015/0357724 | A1 * | 12/2015 | Okuno | C25D 7/00 29/879 |
| 2016/0172069 | A1 * | 6/2016 | Sumiya | C22C 5/06 428/673 |
| 2016/0276768 | A1 * | 9/2016 | Sunaga | C25D 7/00 |
| 2016/0372882 | A1 * | 12/2016 | Matsuo | C22C 21/00 |
| 2017/0271800 | A1 * | 9/2017 | Wagman | H01R 13/40 |
| 2017/0331205 | A1 * | 11/2017 | Kruger | H01R 13/03 |
| 2018/0212350 | A1 * | 7/2018 | Tamura | C25D 7/00 |
| 2018/0316109 | A1 * | 11/2018 | Sunaga | C25D 5/10 |

FOREIGN PATENT DOCUMENTS

| | | |
|---|---|---|
| JP | 2012-256579 | 12/2012 |
| JP | 2014-35959 | 2/2014 |

* cited by examiner

TERMINAL FITTING

BACKGROUND

Field of the Invention

This specification relates to a terminal fitting.

Related Art

Japanese Unexamined Patent Publication No. 2003-297470 discloses a female terminal fitting with a resilient contact piece. This female terminal fitting includes a body in the form of a rectangular tube capable of receiving a tab of a mating male terminal fitting and a resilient contact piece in the form of a leaf spring formed by folding a tongue projecting from the front end of the bottom wall of the body rearwardly. On the other hand, a receiving portion bulging toward the resilient contact piece is provided on a wall of the body facing the resilient contact piece. The female terminal fitting and the male terminal fitting are connected electrically by sandwiching and holding the tab by the resilient contact piece and the receiving portion.

The terminal fitting as described above is manufactured by bending a terminal fitting obtained by stamping a metal plate material into a predetermined shape.

In the female terminal fitting described above, Ag plating is applied to surfaces of the resilient contact piece and the receiving portion to be contacted by the tab for the purpose of reducing contact resistance.

However, in the terminal fitting configured as described above (an example is shown as a terminal fitting 100 in FIG. 6), areas to be plated are distributed on both front and back surfaces in a developed state of this terminal fitting 100 (state of a terminal fitting piece 152 before processing). Specifically, as shown in FIGS. 7 and 8, an area to be Ag-plated is present only on one surface (front surface in FIG. 8) out of both front and back surfaces on a part that will become a resilient contact piece 116 (resilient fragment piece 154), whereas areas to be Ag-plated are present on the other surface (front surface in FIG. 7) on receiving portions 119. Thus, a plating process is complicated, thereby presenting a problem of increasing manufacturing cost.

SUMMARY

A terminal fitting disclosed by this specification includes a body formed of a plate material having a tubular shape. The body is capable of receiving a mating terminal fitting inside. A resilient contact piece is arranged inside the body and is configured to resiliently contact the mating terminal fitting. A pressure receiving piece is arranged to face the resilient contact piece inside the body. The pressure receiving piece is configured to sandwich the mating terminal fitting between the resilient contact piece and the pressure receiving piece. The resilient contact piece is in the form of a plate having one end including a first folded portion curved inward of the body from either one of both end edges of a tube in the body. The pressure receiving piece is in the form of a plate having one end including a second folded portion curved inward of the body from either one of the end edges of the tube in the body. The resilient contact piece has a first facing surface facing the pressure receiving piece and an area of the first facing surface to be contacted by the mating terminal fitting serves as a first plating area having plating applied thereto. The pressure receiving piece has a second facing surface facing the resilient contact piece and an area of the second facing surface to be contacted by the mating terminal fitting serves as a second plating area having plating applied thereto using the same plating material as that for the first plating area.

According to the above configuration, in a developed state of the terminal fitting (state of a terminal fitting piece before bending), the first and second plating areas to which plating is to be applied using the same plating material are present on the same surface. In this way, it is possible to avoid the complication of a plating process and an increase of manufacturing cost.

In the above configuration, the terminal fitting includes a plate-like connecting portion extending outward of the body from either one of the both end edges of the tube of the body. A conductive member is connected to the connecting portion. The connecting portion has a connection surface to be connected to the conductive member and an area of the connection surface to be contacted by the conductive member is a third plating area having plating applied thereto using a plating material different from that for the first and third plating areas. According to the above configuration, in the developed state of the terminal fitting (state of the terminal fitting piece before bending), the third plating area to which plating is to be applied using a plating material different from that for the first and second plating areas is present on a surface different from that for the first and second plating areas. In this way, it is possible to avoid the complication of the plating process and an increase of manufacturing cost.

According to the terminal fitting disclosed by this specification, it is possible to avoid the complication of the plating process and an increase of manufacturing cost.

DETAILED DESCRIPTION

Figure 1:
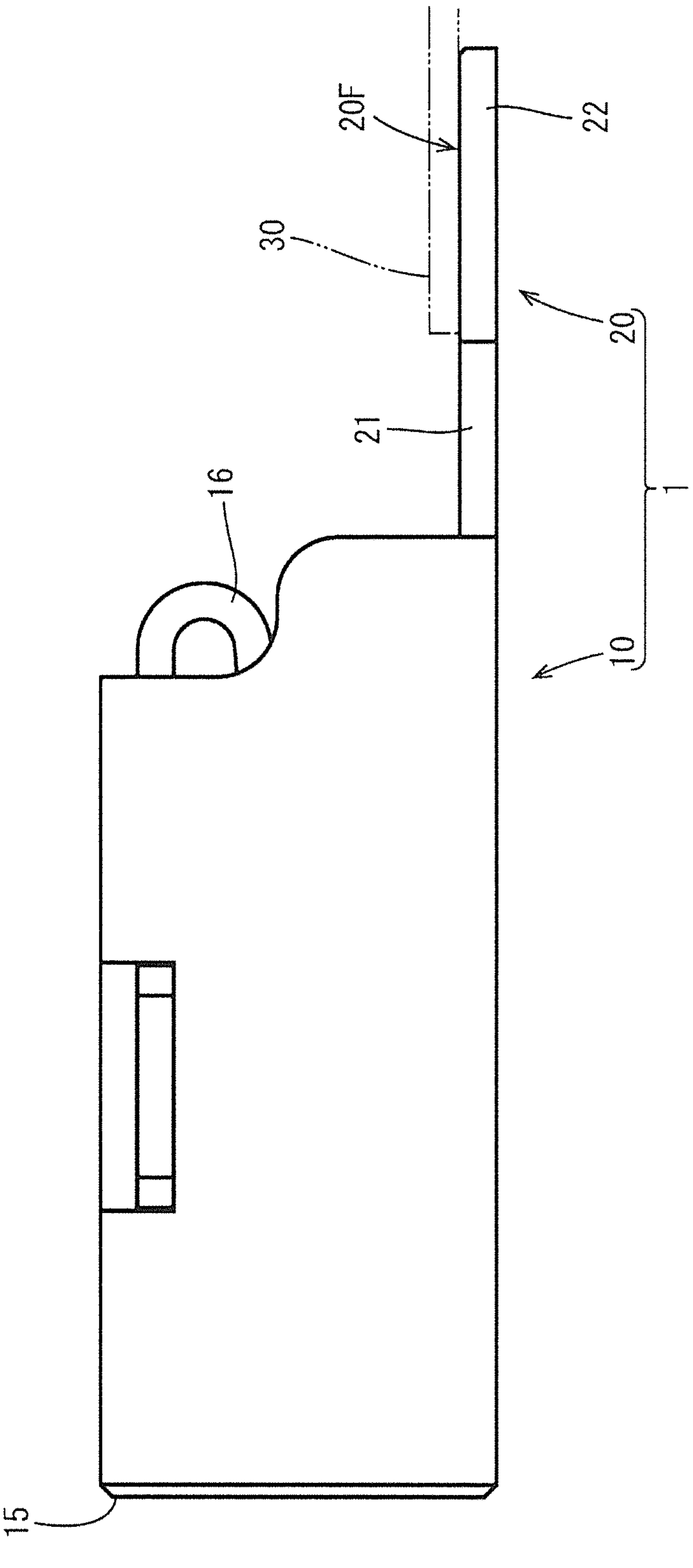
FIG. 1 is a side view of a terminal fitting of an embodiment.

An embodiment is described with reference to FIGS. 1 to 5. A terminal fitting 1 of this embodiment is a female terminal fitting to be connected to a male terminal fitting 40 (corresponding to a mating terminal fitting), and formed by bending a terminal fitting piece 52 obtained by stamping a metal plate material 50 into a shape shown in FIG. 4. As shown in FIG. 1, this terminal fitting 1 includes a body 10 for receiving a tab 41 of the male terminal fitting 40 inside and a connecting portion 20 continuous from the body 10.

Figure 2:
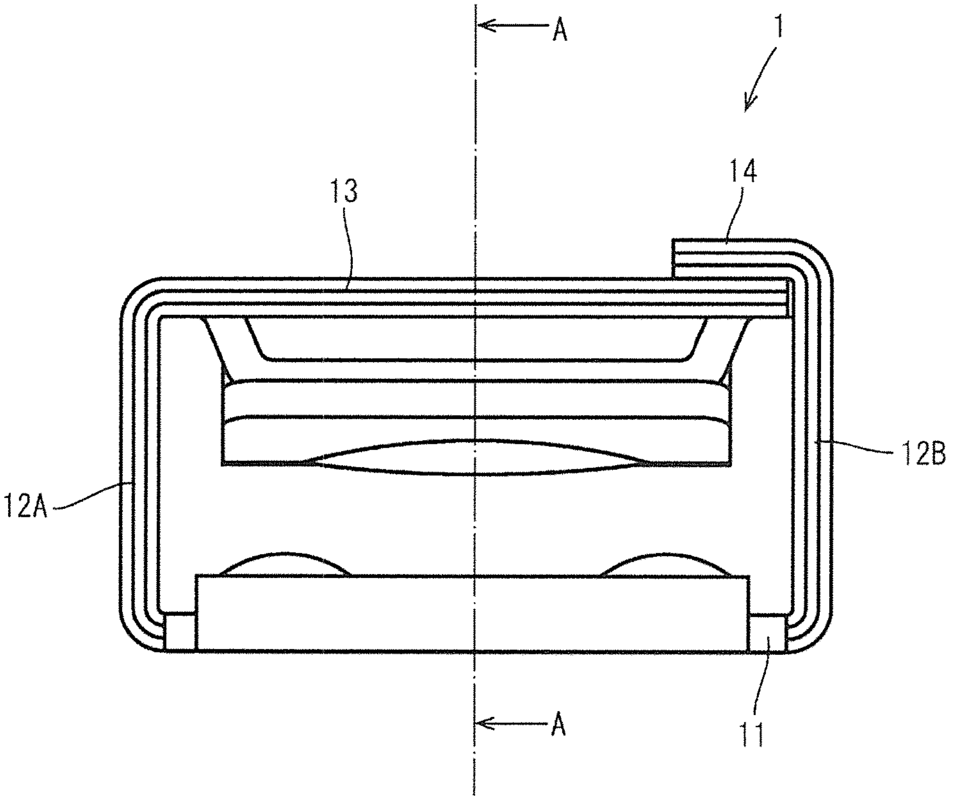
FIG. 2 is a front view of the terminal fitting of the embodiment.

The body 10 is a rectangular tube open on both ends and includes, as shown in FIG. 2, a bottom wall 11, first and second side walls 12A, 12B and a ceiling wall 13. The bottom wall 11 is a long narrow rectangular plate. Each of the side walls 12A, 12B is a long narrow rectangular plate rising perpendicularly up from a corresponding one of two long sides of the bottom wall 11. The first and second side walls 12A, 12B are arranged to face each other. The ceiling wall 13 is a long narrow rectangular plate arranged to face the bottom wall 11 and extends continuously from first side wall 12A toward the second side wall 12B. Note that a locking wall 14 continuous from the second side wall 12B and extending toward the first side wall 12A is arranged to overlap on the outer side surface of the ceiling wall 13.

One of openings on the ends of the body 10 serves as a terminal insertion opening 15 into which the tab portion 41 is to be inserted.

A resilient contact piece 16 and a pressure receiving piece 18 are disposed inside the body 10.

Figure 3:
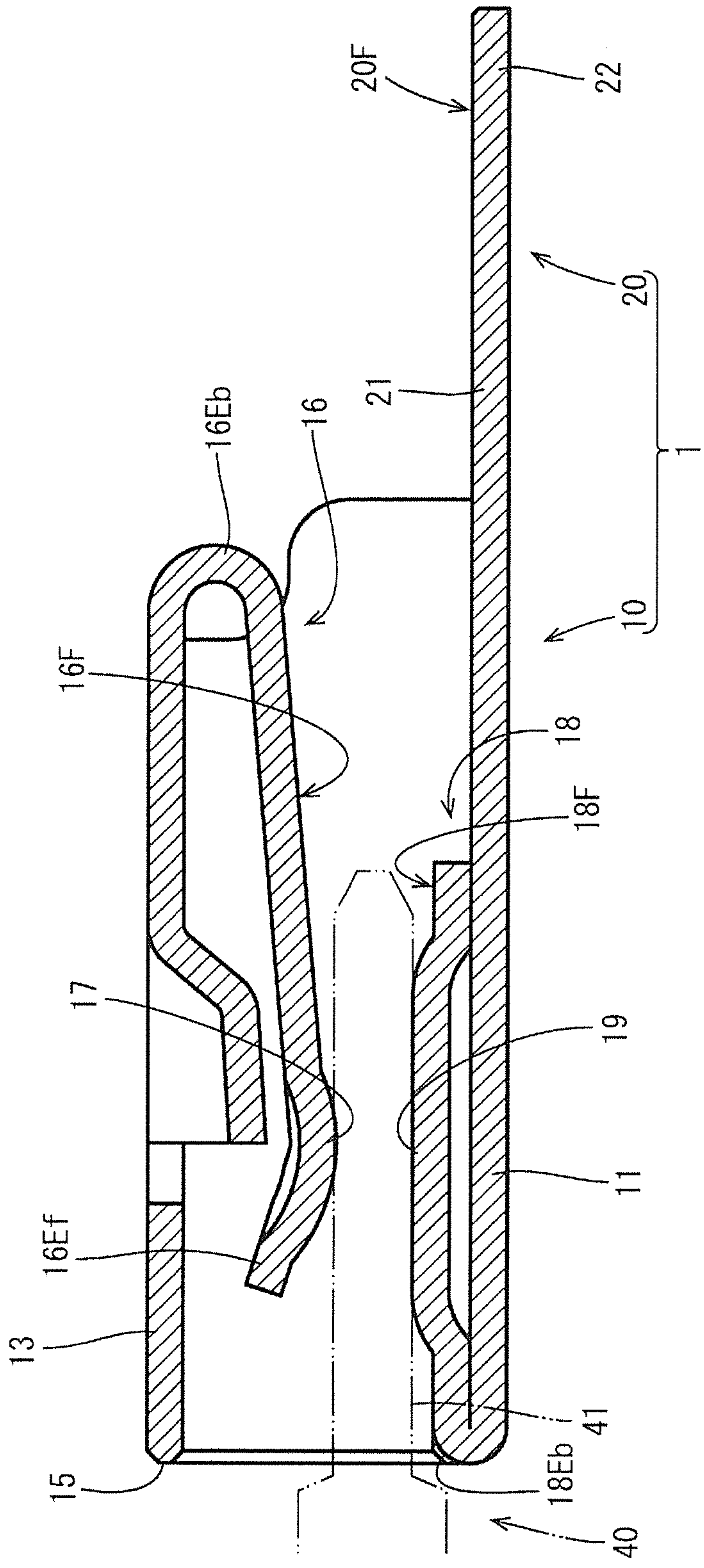
FIG. 3 is a section along A-A of FIG. 2.

As shown in FIG. 3, the resilient contact piece 16 is a leaf spring-like part arranged inside the body 10 and extending along the ceiling wall 13. One end of this resilient contact piece 16 serves as a base end part 16Eb (corresponding to a first folded portion) curved to be folded inward of the body 10 from an end edge of the ceiling wall 13 on a side opposite to the terminal insertion opening 15, and the other end part serves as a free end part 16Ef.

The resilient contact piece 16 has a chevron shape so that the part thereof nearest the base end part 16Eb is separated gently from the ceiling wall 13 with distance from the base end 16Eb and the remaining part near the free end 16Ef gently approaches the ceiling wall 13 toward the free end part 16Ef. A dome-shaped contact point 17 is on a top of the chevron shape and bulges toward the bottom wall 11 for contacting the tab 41.

As shown in FIG. 3, the pressure receiving piece 18 is a plate-like part arranged to contact the bottom wall 11 and face the resilient contact piece 16 inside the body 10, and one end thereof serves as a base end part 18Eb (corresponding to a second folded portion) curved to be folded inward of the body 10 from an end edge of the bottom wall 11 constituting an opening edge of the terminal insertion opening 15. The pressure receiving piece 18 includes two contact protrusions 19 for ensuring a contact pressure with the tab 41 by sandwiching the tab 41 between the contact point 17 and the contact protrusions 19. Each contact protrusion 19 is a dome-shaped part (part facing the contact point 17) of the pressure receiving piece 18 bulging toward the resilient contact piece 16.

A surface of the resilient contact piece 16 facing the pressure receiving piece 18 serves as a first facing surface 16F, and an area of this first facing surface 16F where the contact point 17 is arranged serves as a first plating area 16M (shown by cross-hatching in FIG. 5) to be contacted by the tab 41. Further, a surface of the pressure receiving piece 18 facing the resilient contact piece 16 serves as a second facing surface 18F, and areas of this second facing surface 18 where the two contact protrusions 19 are arranged serve as second plating areas 18M (shown by cross-hatching in FIG. 5) to be contacted by the tab 41.

As shown in FIG. 1, the connecting portion 20 is a flat plate-like part extending from the end edge of the bottom wall 11 on the side opposite to the terminal insertion opening 15, and extends on the same plane as the bottom wall 11. This connecting portion 20 includes a coupling 21 continuous from the bottom wall 11 and a fixing portion 22 continuous from the coupling 21 and wider than the coupling 21. The fixing portion 22 is a part to which a flexible and conductive connecting member 30 (corresponding to a conductive member; e.g. braided wire) is connected by resistance welding. A surface (upper surface in FIG. 1) of the connecting portion 20 facing the same side as the inner side surface of the bottom wall 11 serves as a connection surface 20F, and the connecting member 30 is connected to this connection surface 20F. An area of the connection surface 20F where the fixing portion 22 is arranged serves as a third plating area 20M (shown by shading in FIG. 4).

The terminal fitting 1 is made of a metal material such as copper or copper alloy, and Ag plating is entirely applied to the outer side surface of the body 10, a surface of the connecting portion 20 opposite to the connection surface 20F, the first facing surface 16F (surface including the first plating area 16M) of the resilient contact piece 16 and the second facing surface 18F (including the second plating areas 18M) of the pressure receiving piece 18. Further, Sn plating is entirely applied to the inner side surface of the body portion 10, the connection surface 20F (surface including the third plating area 20M) of the connecting portion 20, a surface (surface facing the ceiling wall 13) of the resilient contact piece 16 opposite to the first facing surface 16F and a surface (surface facing the bottom wall 11) of the pressure receiving piece 18 opposite to the second facing surface 18F.

Joint quality in welding the connecting member 30 to the fixing portion 22 is ensured by applying Sn plating to the connection surface 20F including the third plating area 20M. Further, contact resistance at the time of connection to the tab portion 41 can be reduced by applying Ag plating to the first facing surface 16F including the first plating area 16M and the second facing surface 18F including the second plating areas 18M.

An example of a manufacturing method of the terminal fitting 1 configured as described above is described below.

Figure 4:
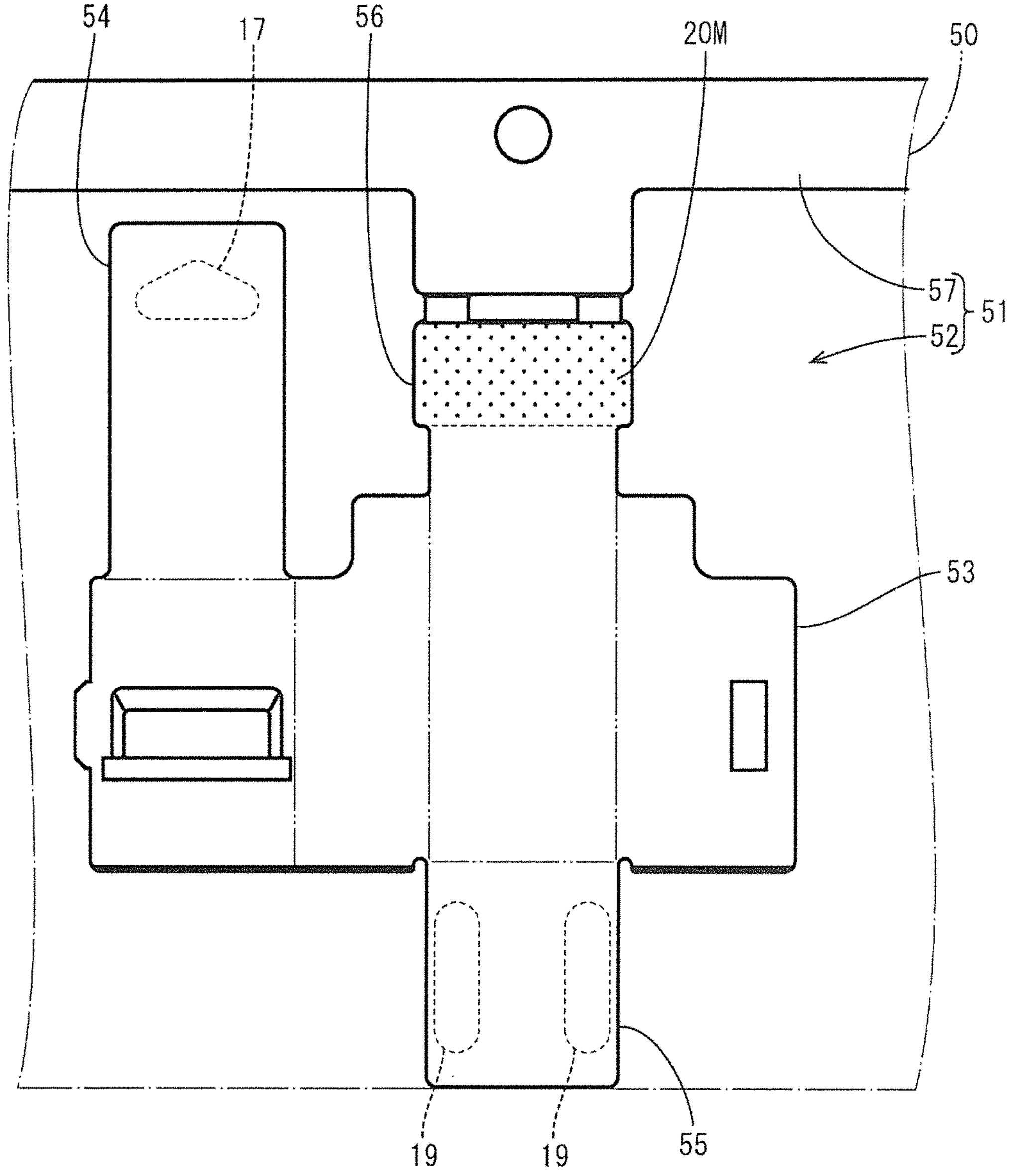
FIG. 4 is a partial enlarged plan view of a chained terminal of the embodiment.
Figure 5:
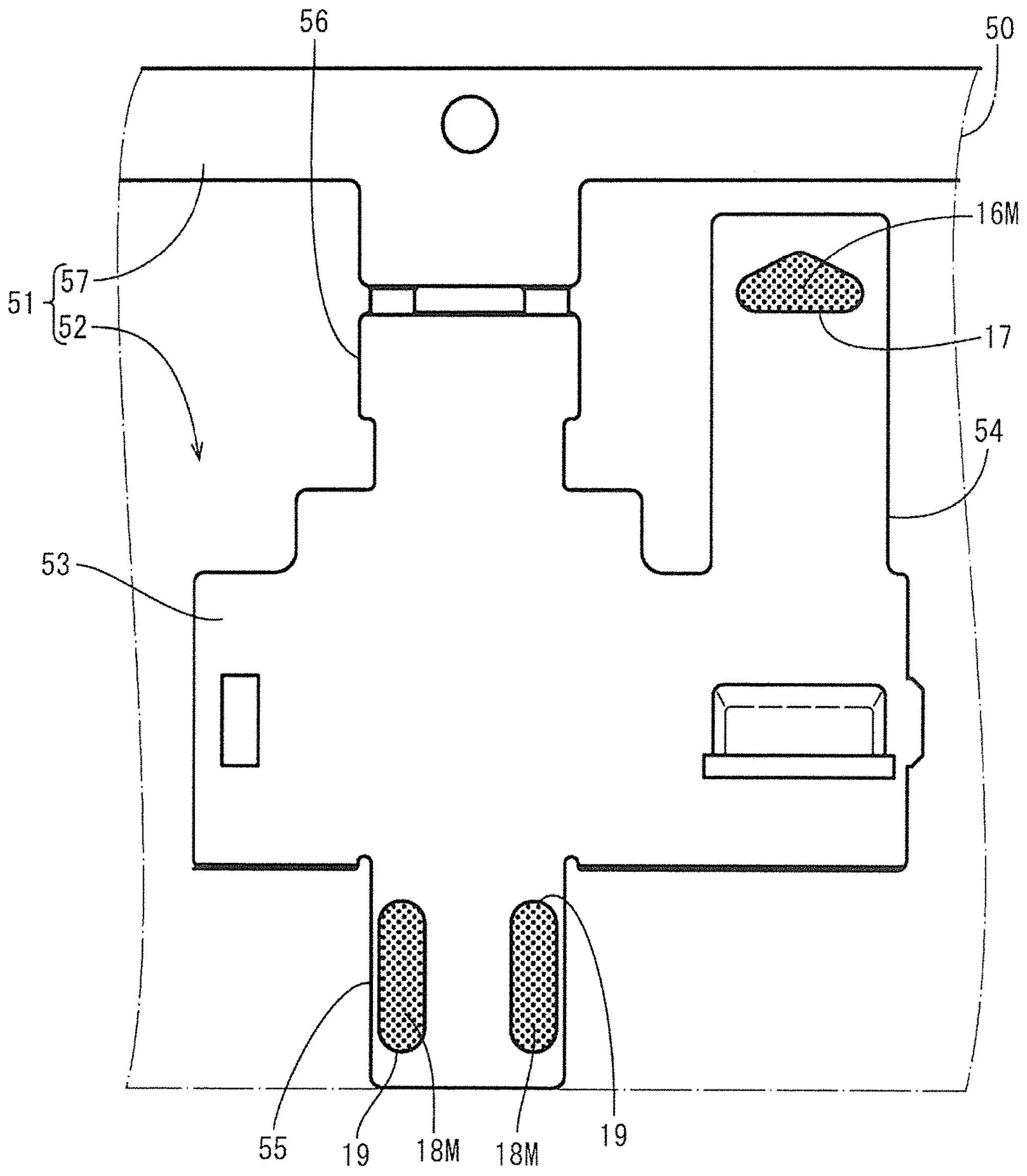
FIG. 5 is a partial enlarged bottom view of the chained terminal of the embodiment.

First, Sn plating is applied entirely to one surface (front surface in FIG. 4) of the metal plate material 50 as a material of the terminal fitting 1 and Ag plating is entirely applied to the other surface (front surface in FIG. 5).

Subsequently, the plated metal plate material 50 is press-worked to obtain chained terminals 51 in which the terminal fitting pieces 52 that will become the terminal fittings 1, are coupled to one strip-like carrier 57, as shown in FIGS. 4 and 5. The terminal fitting pieces 52 are arranged at equal intervals along a longitudinal direction of the carrier 57.

Each terminal fitting piece 52 is a plate-like part including a plate-like body panel 53 that will become the body 10, a resilient panel 54 that extends from the body panel 53 and will become the resilient contact piece 16, a pressure receiving panel 54 that extends from the body panel 53 and will become the pressure receiving piece 18, and a connecting panel 56 that extends from the body panel 53 and will become the connecting portion 20. The resilient panel 54 is struck to form the contact point 17, and the pressure receiving panel 55 is struck to form the contact protrusions 19.

A surface (surface including the first plating area 16M) of the resilient panel 54 that will become the first facing surface 16F and a surface (surface including the second plating areas 18M) of the pressure receiving panel 55 that will become the second facing surface 18F are disposed on a surface (Ag-plated surface: front surface in FIG. 5) of the terminal fitting piece 53 on the same side. Further, a surface (surface including the third plating area 20M) of the connecting panel 56 that will become the connection surface 20F is disposed on a surface (Sn-plated surface; front surface in FIG. 4) opposite to the surface including the first plating area 16M and the second plating areas 18M.

Subsequently, in each terminal fitting piece 52, the resilient panel 54 is folded at a folding position indicated by a chain double-dashed line in FIG. 4, thereby being caused to extend along the body panel 53, and bent to have the shape of the resilient contact piece 16. Further, the pressure receiving panel 55 is folded at a folding position indicated by a chain double-dashed line in FIG. 4, thereby being caused to extend along the body panel 53. Subsequently, the body panel 53 is bent at folding positions indicated by chain double-dashed lines in FIG. 4 into a rectangular tube shape. In this way, the body 10 having the resilient contact piece 16 and the pressure receiving piece 18 arranged inside is formed. Finally, each terminal fitting piece 52 is cut off from the carrier 57. In this way, the terminal fitting 1 is completed.

In connecting the terminal fitting 1 configured as described above to the male terminal fitting 40, the tab 41 is inserted into the body 10 through the terminal insertion opening 15, comes into contact with the contact point 17 of the resilient contact piece 16 and presses the resilient contact piece 16 toward the ceiling wall 13, as shown in FIG. 3. Then, the tab 41 is sandwiched between the contact point 17 and the contact protrusions 19 of the pressure receiving piece 18 by a resilient force of the resilient contact piece 16. In this way, the terminal fitting 1 and the male terminal fitting 40 are connected electrically.

As described above, the terminal fitting 1 includes the body 10 formed of a plate material having a rectangular tube shape and capable of receiving the male terminal fitting 40 inside. The resilient contact piece 16 is arranged inside the body 10 and is configured to resiliently contact the tab 41 of the male terminal fitting 40. The pressure receiving piece 18 is arranged to face the resilient contact piece 16 inside the body 10 and is configured to sandwich the tab 41 between the resilient contact piece 16 and the pressure receiving piece 18. The resilient contact piece 16 is in the form of a plate having the base end part 16Eb curved inward of the body 10 from the end edge on the side opposite to the terminal insertion opening 15, and the pressure receiving piece 18 is in the form of a plate having the base end part 18Eb curved inward of the body 10 from the end edge constituting the opening edge of the terminal insertion opening 15 in the body 10. The resilient contact piece 16 has the first facing surface 16F facing the pressure receiving piece 18, and the area of the first facing surface 16F where the contact point 17 to be contacted by the tab 41 is arranged serves as the Ag-plated first plating area 16M. Further, the pressure receiving piece 18 has the second facing surface 18F facing the resilient contact piece 16, and the areas of the second facing surface 18F where the contact protrusions 19 are arranged serves as the Ag-plated second plating areas 18M.

According to the above configuration, the first plating area 16M and the second plating areas 18M are to have the same Ag plating applied and are disposed on the same surface (front surface in FIG. 5) in the developed state of the terminal fitting 1 (state of the terminal fitting piece 52 before bending). Thus, it is sufficient to apply Ag plating to one surface of the metal plate material 50 as a base material of the terminal fitting 1. In this way, it is possible to avoid the complication of a plating process and an increase of manufacturing cost.

Further, the terminal fitting 1 includes the plate-like connecting portion 20 extending outward of the body 10 from the end edge on the side opposite to the terminal insertion opening 15 in the body 10. The connecting portion 20 has the connection surface 20F to be connected to the connecting member 30, and the area of the connection surface 20F to be contacted by the connecting member 30 serves as the third plating area 20M having plating applied thereto using Sn, which is a plating material different from that for the first and second plating areas 16M, 18M.

Figure 6:
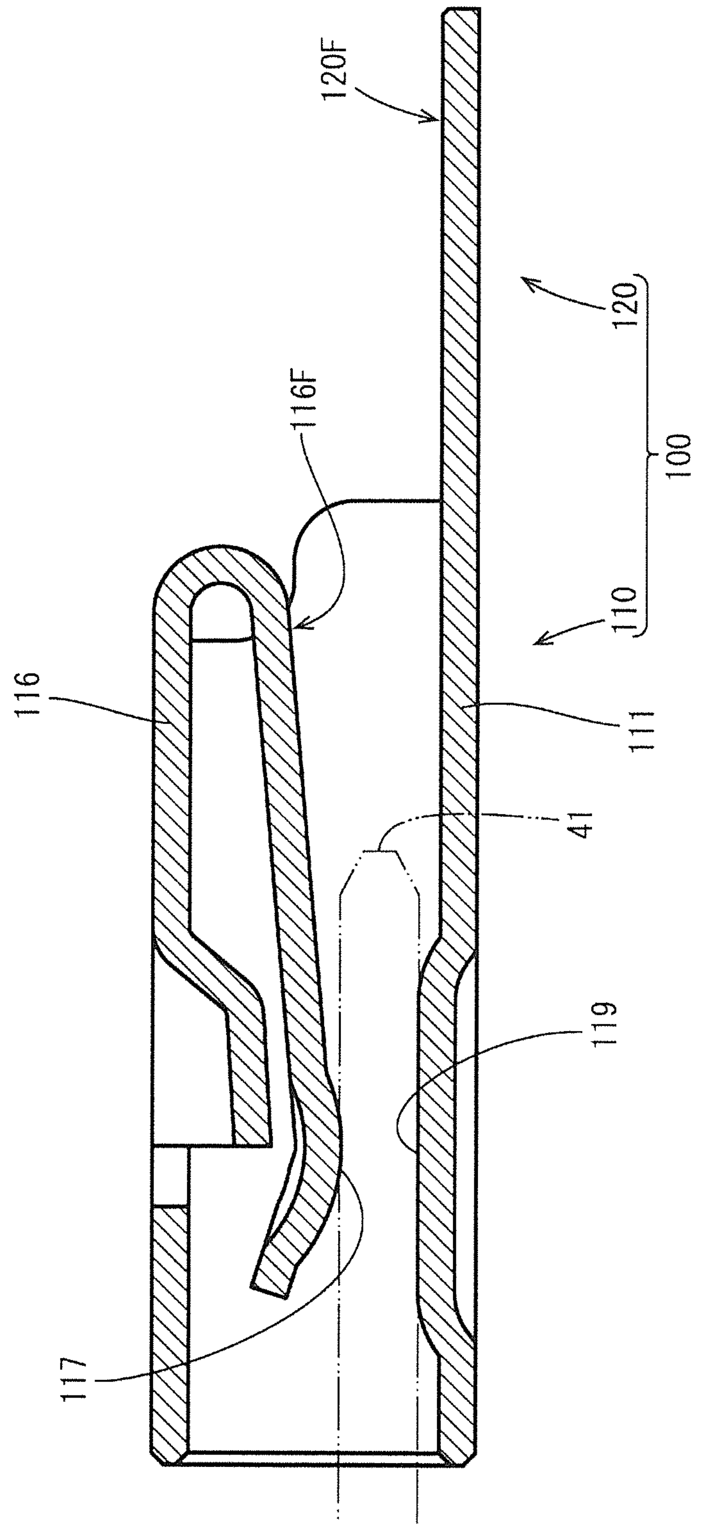
FIG. 6 is a section of a conventional terminal fitting.

The conventional terminal fitting 100 shown in FIG. 6 has the receiving portions 119 on a bottom wall 111 and the tab 41 is sandwiched between the receiving portions 119 and the resilient contact piece 116. The resilient contact piece 116 has a first facing surface 116F facing the tab 41, and an area of the first facing surface 116F with a contact point 117 to be contacted by the tab 41 serves as a first plating area 116M to which Ag plating should be applied. Further, areas of the inner side surface of the bottom wall 111 where the receiving portions 119 are arranged serves as second plating areas 119M to which Ag plating should be applied. Furthermore, a connecting portion 120 has a connection surface 120F to be connected to the connecting member 30, and an area of this connection surface 120F to be contacted by the connecting member 30 serves as a third plating area 120M to which Sn plating should be applied.

Figure 7:
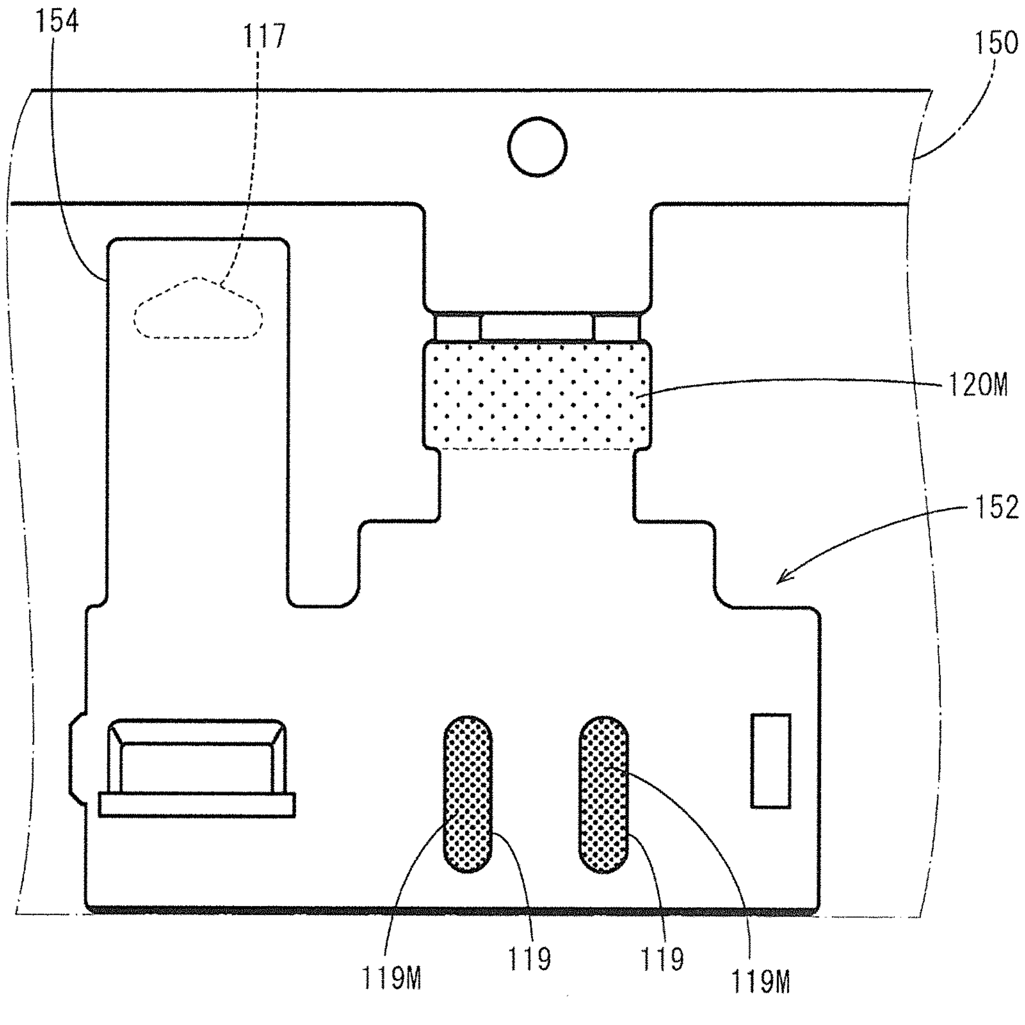
FIG. 7 is a partial enlarged plan view of a conventional chained terminal.
Figure 8:
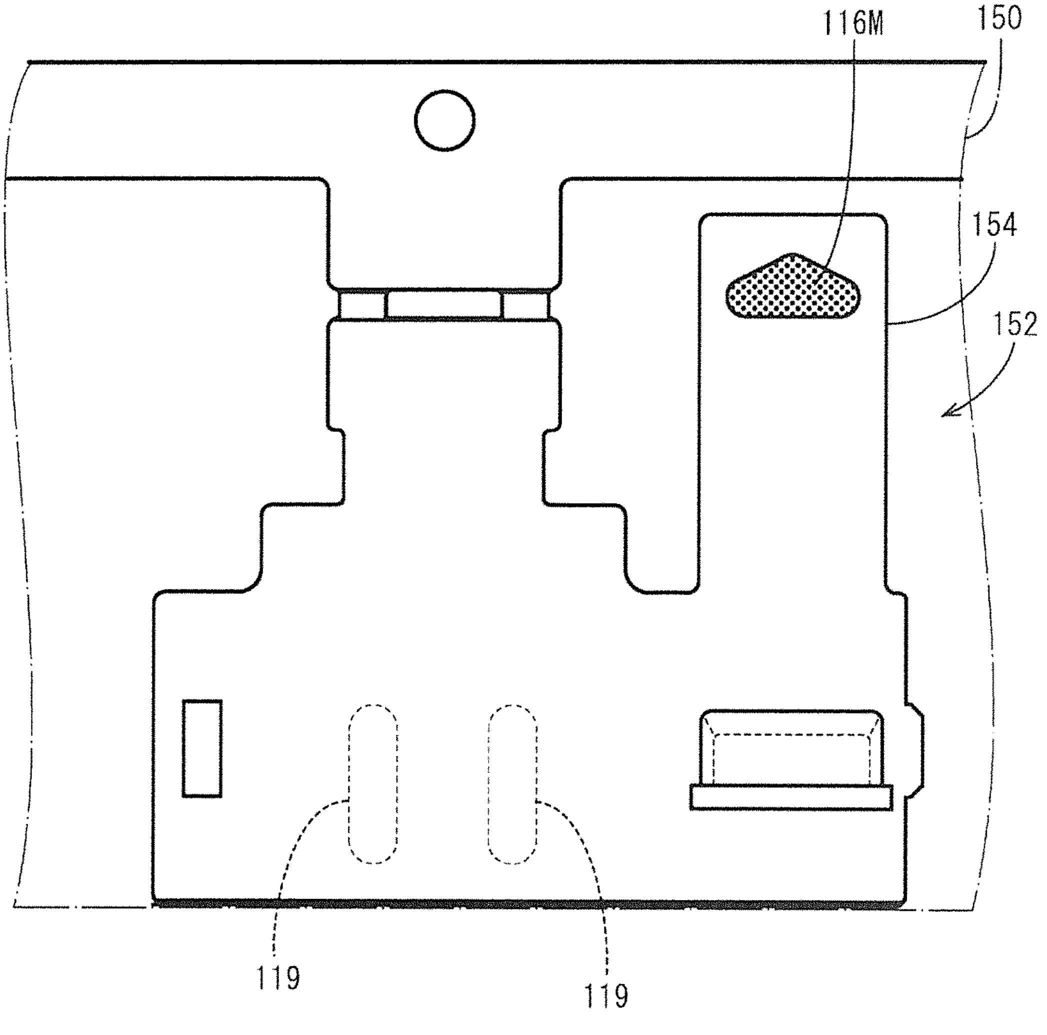
FIG. 8 is a partial enlarged bottom view of the chained terminal.

In the terminal fitting 100 thus configured, as shown in FIGS. 7 and 8, the second plating areas 119M (areas to which Ag plating should be applied) and the third plating area 120M (area to which Sn plating should be applied) are present on the same surface (front surface in FIG. 7), whereas the first plating area 116M (area to which Ag plating should be applied) is present on the surface (front surface in FIG. 8) opposite to the former surface in a developed state (state of the terminal fitting piece 152 before bending). Thus, stripe plating and partial plating have to be applied to the surface where the second plating areas 119M and the third plating area 120M are present and, further, plating has to be applied to the surface where the first plating area 116M is present. As a result, the plating process is complicated.

However, according to the configuration of this embodiment, in the developed state of the terminal fitting 1 (state of the terminal fitting piece 52 before bending), the first plating area 16M and the second plating areas 18M to which plating is to be applied using the same plating material (Ag) are present on the same surface and the third plating area 20M to which plating is to be applied using the plating material (Sn) different from that for these first and second plating areas 16M, 18M is present on the different surface. Thus, it is sufficient to apply Ag plating to the one surface of the metal plate material 50 as the base material of the terminal fitting 1 and apply Sn plating to the other surface. In this way, it is possible to avoid the complication of the plating process and an increase of manufacturing cost.

The invention is not limited to the above described and illustrated embodiment. For example, the following modes also are included.

Although press-working and bending are performed after plating is applied to the metal plate material 50 in the above embodiment, plating may be applied, before bending, to the terminal fitting piece 52 obtained by press-working.

Although Sn plating is applied entirely to one surface of the metal plate material 50 and Ag plating is applied entirely to the other surface in the above embodiment, Sn plating may be applied to the one surface of the metal plate material 50 with an area excluding the third plating area covered by a masking member and Ag plating may be applied to the other surface with an area excluding the first and second plating areas covered by a masking member.

LIST OF REFERENCE SIGNS

1 . . . terminal fitting
10 . . . body
16 . . . resilient contact piece
16Eb . . . base end part (first folded portion)
16F . . . first facing surface
16M . . . first plating area
18 . . . pressure receiving piece
18Eb . . . base end part (second folded portion)

18F . . . second facing surface
18M . . . second plating area
20 . . . connecting portion
20F . . . connection surface
20M . . . third plating area
30 . . . connecting member (conductive member)
40 . . . male terminal fitting (mating terminal fitting)

The invention claimed is:

1. A terminal fitting, comprising:

a metal plate material having opposite first and second surfaces;

a first plating formed from a first metal and applied to all of the first surface only;

a second plating formed from a second metal and applied to all of the second surface only, the second metal being different than the first metal, wherein the metal plate material is formed to define:

a tubular body having opposite first and second ends and opposed first and second walls, the tubular body being formed so that the first plating faces outward, a resilient contact piece extending from the first wall of the tubular body at one of the ends of the tubular body and being folded into the tubular body so that the first plating faces toward the second wall, a pressure receiving piece extending from the second wall of the tubular body at one of the ends of the tubular body and being folded into the tubular body so that the first plating faces toward the resilient contact piece, and a connecting portion extending from one of the ends of the tubular body, a surface of the connecting portion having the second plating applied thereto defining a connection surface to be connected to a conductive member.

2. The terminal fitting of claim 1, wherein the first plating is Ag.

3. The terminal fitting of claim 2, wherein the second plating is Sn.

4. The terminal fitting of claim 1, wherein the resilient contact piece and the pressure receiving piece extend from opposite ends of the tubular body.

5. The terminal fitting of claim 4, wherein the resilient contact piece and the connecting portion extend from the second end of the tubular body.

6. The terminal fitting of claim 1, wherein the first plating faces out on the tubular body.

* * * * *